US010634256B2

(12) United States Patent
Stein (10) Patent No.: US 10,634,256 B2
(45) Date of Patent: Apr. 28, 2020

(54) PROTECTIVE RING, SEALING ARRANGEMENT AND JOURNAL CROSS ASSEMBLY (71) Applicant: SPICER GELENKWELLENBAU GMBH, Essen (DE)

(72) Inventor: Thomas Stein, Essen (DE)

(73) Assignee: Spicer Gelenkwellenbau GmbH, Essen (DE)

(*) Notice: Subject to any disclaimer, the term of this patent is extended or adjusted under 35 U.S.C. 154(b) by 110 days.

(21) Appl. No.: 15/751,278

(22) PCT Filed: Jul. 18, 2016

(86) PCT No.: PCT/EP2016/067089
§ 371 (c)(1),
(2) Date: Feb. 8, 2018

(87) PCT Pub. No.: WO2017/025281
PCT Pub. Date: Feb. 16, 2017

(65) Prior Publication Data
US 2018/0266564 A1 Sep. 20, 2018

(30) Foreign Application Priority Data
Aug. 11, 2015 (EP) .................................. 15180633.8

(51) Int. Cl.
F16J 15/3276 (2016.01)
F16D 3/38 (2006.01)
(Continued)

(52) U.S. Cl.
CPC ........... *F16J 15/3276* (2013.01); *F16C 33/76* (2013.01); *F16D 3/385* (2013.01); *F16D 3/41* (2013.01); *F16J 15/3268* (2013.01)

(58) Field of Classification Search
CPC .... F16J 15/3276; F16J 15/3268; F16C 33/76; F16D 3/41; F16D 3/385; F16D 3/84; F16D 3/38
(Continued)

(56) References Cited

U.S. PATENT DOCUMENTS 4,515,574 A 5/1985 Mazziotti
4,874,349 A 10/1989 Gall
(Continued)

FOREIGN PATENT DOCUMENTS

CN 1036441 A 10/1989
CN 102812259 A 12/2012
(Continued)

OTHER PUBLICATIONS

China National Intellectual Property Administration, Notice of First Office Action in Application No. 201680047196.7, dated Oct. 9, 2018, 14 pages.
(Continued)

Primary Examiner — Greg Binda
(74) Attorney, Agent, or Firm — Marshall & Melhorn, LLC (57) ABSTRACT A protective ring for a sealing arrangement of a bearing bushing of a journal cross assembly. The protective ring has an annular sleeve segment, which is concentric to a longitudinal axis, an annular seat segment which extends radially inward at a rear axial end of the sleeve segment, and at least one protrusion, which protrudes radially inward at a front axial end region of the sleeve segment. The protective ring also has a plurality of webs, which are distributed over the circumference and which protrude axially from the seat segment and are arranged inside the sleeve segment.

5 Claims, 5 Drawing Sheets (51) Int. Cl.
*F16D 3/41* (2006.01)
*F16C 33/76* (2006.01)
*F16J 15/3268* (2016.01)

(58) Field of Classification Search
USPC .................................................. 464/131, 133
See application file for complete search history.

(56) References Cited

U.S. PATENT DOCUMENTS

| | | | | |
|---|---|---|---|---|
| 4,932,923 | A * | 6/1990 | Thompson | F16C 33/7809 464/131 |
| 5,588,915 | A | 12/1996 | Smith | |
| 6,050,571 | A | 4/2000 | Rieder et al. | |
| 6,357,754 | B1 | 3/2002 | Rieder et al. | |
| 6,601,855 | B1 * | 8/2003 | Clark | F16C 33/7809 464/133 |
| 7,361,093 | B2 * | 4/2008 | Kurzeja | F16D 3/41 464/131 |
| 2008/0131044 | A1 * | 6/2008 | Bauer | F16C 19/46 |

FOREIGN PATENT DOCUMENTS

| | | |
|---|---|---|
| CN | 203847706 U | 9/2014 |
| DE | 8616597 U1 | 7/1986 |
| DE | 19637553 C1 | 11/1997 |
| DE | 19701461 A1 | 7/1998 |
| DE | 19754699 A1 | 6/1999 |
| EP | 0321076 A1 | 6/1989 |
| EP | 1225355 A2 | 7/2002 |
| JP | 01-166828 U1 | 11/1989 |
| JP | 20022333038 A | 11/2002 |
| JP | 4408831 B2 | 2/2010 |

OTHER PUBLICATIONS

European Patent Office, The International Search Report with Written Opinion issued in PCT/EP2016/067089, dated Oct. 19, 2016; 16 pages, European Patent Office, Rijswijk, Netherlands.
Japanese Patent Office, Japanese Office Action in Application 2018-503164 with English Translation, dated Sep. 5, 2018, 7 pages.

* cited by examiner

PROTECTIVE RING, SEALING ARRANGEMENT AND JOURNAL CROSS ASSEMBLY

BACKGROUND OF THE DISCLOSURE

The invention relates to a protective ring for a sealing arrangement of a bearing bushing of a journal cross assembly, wherein the protective ring has an annular sleeve segment, formed concentrically to a longitudinal axis. Furthermore, the protective ring has an annular seat segment, which extends from a rear axial end of the sleeve segment radially inwards. At least one protrusion is arranged at a front axial end portion of the sleeve segment and projecting radially inwards. Furthermore, the protective ring has a plurality of webs, arranged distributedly along the circumference, projecting axially from the seat segment and arranged within the sleeve segment.

Such a protective ring serves to be pushed onto a bearing bushing of a journal cross assembly, wherein the at least one protrusion engages in an outer circumferential groove of the bearing bushing and is locked therein. The protective ring can be pushed with the seat segment onto a journal of the journal cross of the journal cross assembly and be fixed thereto.

Such a protective ring is known from DE 196 37 553 C1. The sealing, described there, for a bearing bushing has a main seal with a carrier and a preseal. The main seal rests force-fittingly in an inner wall of the bearing bushing. The main seal has sealing lips facing radially inwards and abuting a sealing face of a bearing journal. The preseal rests non-rotationally on the bearing journal of the journal cross and has a leg, which abuts with a sealing edge an outer sealing face of the bearing bushing. Axially distanced to the sealing edge a holding protrusion is provided, which projects radially inwards.

Together with the holding protrusion the preseal can be attached for the preassembly on the carrier of the main seal. For this, in the non-mounted condition the holding protrusion has an opening cross-section, which is smaller than the cross-section of a collar of the carrier.

A different protective ring is known from DE 197 54 699 A1. There, a sealing of a bearing bushing is described with a reinforced seal and a preseal. The reinforced seal rests force-fittingly in an inner wall of the bearing bushing. The reinforcement of the seal has a leg, directed radially inwards, on which a radial shaft sealing ring is mounted. The radial shaft sealing ring seals between the bearing bushing and the surface of the journal of the journal cross. Furthermore, the seal has a sealing lip, axially aligned and which is held in abutment to the preseal. The preseal rests non-rotationally on the journal of the journal cross and has a leg, which engages around an end portion of the bearing bushing. The preseal has also a reinforcement, which has an L-shaped cross-sectional contour. The leg engaging around the bearing bushing has locking projections directed radially inwards, by means of which the preseal rests in an outer circumferential groove of the bearing bushing and is locked therein. The leg of the reinforcement, directed radially inwards, is rubberised and rests with the rubber lining fixedly on the journal of the journal cross. Furthermore, an end side of the bearing bushing is axially supported on the inside against the rubber lining of the preseal.

A comparable sealing arrangement is disclosed in DE 197 01 461 A1.

U.S. Pat. No. 4,874,349 A discloses a sealing arrangement with a main seal, which is inserted into a bearing bushing and the bearing bushing is sealed against an outer circumferential face of the journal of a journal cross. Furthermore, this citation discloses a protective ring, arranged in front of the open end of the bearing bushing and engaging around the bearing bushing. The protective ring has an L-shaped cross-sectional contour, wherein a cylindrical leg portion of the protective ring is pushed onto the open end of the bearing bushing and is locked with flange portions in an outer circumferential groove of the bearing bushing. A leg of the support ring, facing radially inwards, rests force-fittingly on an outer circumferential face of the journal.

A comparable sealing arrangement is shown in U.S. Pat. No. 5,588,915 A, wherein the protective ring has a plurality of protrusions distributed along the circumference and facing inwards and by means of which the protective ring engages in an outer circumferential groove of the bearing bushing, wherein the outer circumferential groove is formed by a recess in the bearing bushing and a carrier of the main seal.

Object of the present invention is, to provide a protective ring, which ensures a secure assembly of the protective ring on a journal of a journal cross and enables a good ability of lubricating the bearing of a bearing bushing of a journal cross assembly.

The object is met according to the invention by a protective ring according to claim 1. Furthermore, the object is met by a sealing arrangement according to claim 6 and a journal cross assembly according to claim 8. Preferred exemplary embodiments are given in the dependent claims.

Because of the webs arranged distributedly along the circumference, it is ensured, that during the assembly of the support ring onto the bearing bushing and during the assembly of the bearing bushing with the preassembled support ring onto a journal of a journal cross, the support ring is axially supported via the webs, i.e. within the sleeve segment, against the bearing bushing. The sleeve segment itself serves thus not, as often in protective rings according to the State of the Art, as an axial support. Therefore, the sleeve segment can be formed thin. Thus, the bearing bushing with the pushed-on protection ring can be pushed onto a journal of a journal cross, till the protective ring with its seat segment is mounted securely and non-rotationally on the journal. During this pushing-on the webs serve as support. A secure axial support is necessary, as the seat segment has a central accommodation bore, by means of which the seat segment rests with oversize on an outer circumferential face of the journal.

Furthermore, the webs provide that the seat segment, which projects in the form of a flange radially inwards from the sleeve segment, is arranged at an axial distance to an end face of the bearing bushing. Thus, when lubricating of a bearing within the bearing bushing, grease can be forced forward through the end face of the bearing bushing and the seat segment between the webs radially to the outside.

Preferably, the sleeve segment is arranged at a radial distance to the outer circumferential face of the bearing bushing, so that the grease can exit to the outside.

The protective ring serves as a protection of a main seal, which can be arranged between the journal and the bearing bushing. The protective ring can also have sealing lips and/or a rubber lining, wherein the protective ring itself is manufactured from metal or plastic material. Furthermore, the protective ring can serve as preseal for the main seal.

The concave recess ensures a sufficient gap between the outer circumferential face of the bearing bushing and the inner circumferential face of the protective ring. Thus, it is prevented, that during the varnishing process after the assembly of the protective ring on the bearing bushing capillary forces are produced, which pull the applied varnish into the radial gap between the sleeve segment and the bearing bushing. This would lead to the fact, that, when the varnish is hardened, the protective ring is connected rigidly to the bearing bushing. The support ring should however rest non-rotationally on the journal and a relative movement should be enabled between the protective ring and the bearing bushing.

Because of the concave recess, a thin filigree end portion of the sleeve segment is produced, which is especially endangered, to be damaged during the pushing-on of the bearing bushing with preassembled protective ring onto the journal of a journal cross. Thus, the webs, arranged distributedly along the circumference, ensure especially, that the thin end portion of the sleeve segment of the support ring is protected, when the bearing bushing is mounted onto a journal.

Preferably, the webs are respectively arranged in a transitional area between the sleeve segment and the seat segment, so that the webs are connected to the sleeve segment as well as to the seat segment, preferably are formed integrally therewith. Thus, the webs are stabilised and can absorb the transversal forces, which can unintendedly be produced during the assembly, when the bearing bushing is rotated relative to the protective ring.

Preferably, a plurality of protrusions is arranged distributedly along the circumference. These serve to engage in an outer circumferential groove of the bearing bushing. However, it is also possible that only one circumferentially extending protrusion is provided.

In an inner circumferential face of the sleeve segment axially extending grooves can be arranged, by means of which the protrusions are separated from each other. The grooves ensure the exiting of grease during the lubrication of the bearing bushing.

The protrusions arranged distributedly along the circumference can project with different extent radially inwards. Thus, all protrusions can engage in the outer circumferential groove of the bearing bushing and can lock the protective ring therein. Further, some of the protrusions can project with a smaller extension radially inwards, to facilitate the assembly of the protective ring on the bearing bushing. During the pushing-on of the protective ring onto the bearing bushing, namely the sleeve segment is deformed radially outwards till the protrusions snap into the outer circumferential groove of the bearing bushing. If some of the protrusions have a smaller radial extension inwards, the sleeve segment does not have to be deformed so far as in an embodiment with protrusions, which project all identically radially inwards.

BRIEF DESCRIPTION OF THE DRAWINGS

A preferred embodiment is described in detail in the following by using the Figures. Herein it shows FIG. 1 a half-sectional view of a universal joint shaft, FIG. 2 a perspective representation of the journal cross assembly of FIG. 1, FIG. 3 a first longitudinal sectional view through one of the journals of FIG. 2, FIG. 4 an enlarged representation of the protective ring according to the detail IV in FIG. 3, FIG. 5 a further longitudinal sectional view through a journal of FIG. 2, FIG. 6 an enlarged representation of the protective ring according to the detail VI in FIG. 5, FIG. 7 a perspective representation of the protective ring of FIG. 2, FIG. 8 a top view of the protective ring of FIG. 7, FIG. 9 the representation of the cross-sectional contour along the intersection line IX-IX of FIG. 8, FIG. 10 the representation of the cross-sectional contour along the intersection line X-X of FIG. 8, FIG. 11 the representation of the cross-sectional contour along the intersection line XI-XI of FIG. 8.

DETAILED DESCRIPTION TO THE DISCLOSURE

Figure 1:
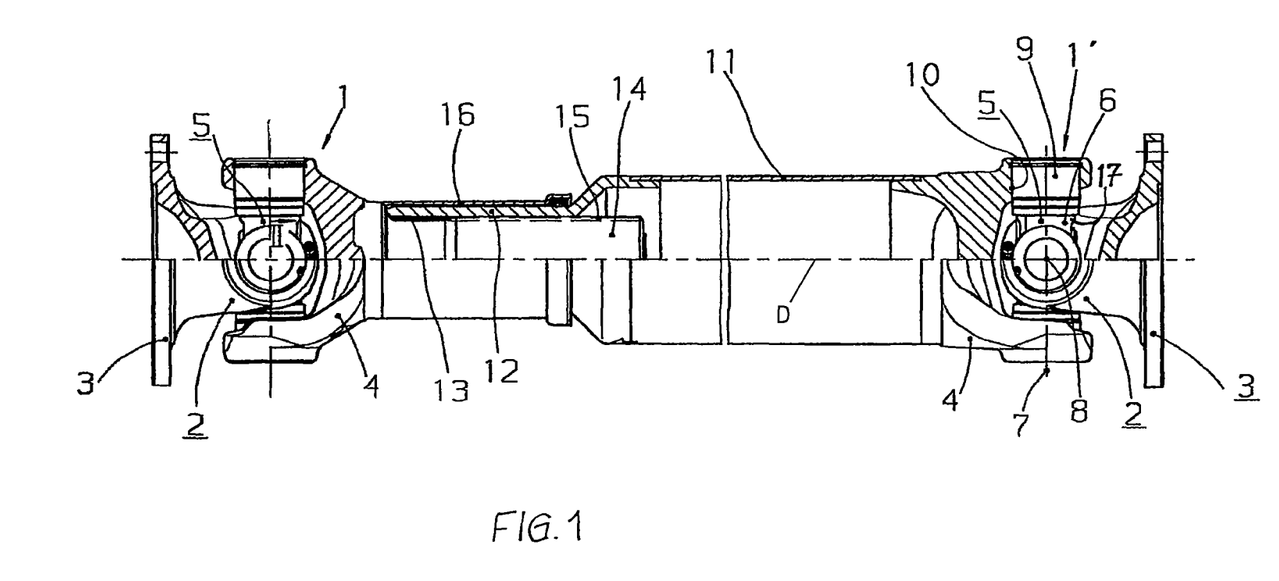

FIG. 1 shows a universal joint shaft with the two universal joints 1, 1'. Each of the universal joints 1, 1' has a first joint yoke 2, provided with a flange 3. Furthermore, a second joint yoke 4 is provided for each universal joint 1, 1'. Both joint yokes 2, 4 are connected to each other by a journal cross assembly 5 such, that the first joint yoke 2 can carry out pivot movements around the longitudinal axis 8 and the assembly of the first joint yoke 2 and of the journal cross assembly 5 can carry out a pivot movement relative to the second joint yoke 4 around the second longitudinal axis 7. The journal cross assembly 5 comprises a journal cross 6 with four journals 17, to each of which one bearing arrangement is assigned, comprising a bearing bushing 9 received in the yoke bore 10 of the respective joint yoke 2, 4.

On the second joint yoke 4, belonging to the joint 1, a tube 11 is rigidly connected. Latter carries a plunging sleeve 12, having a central bore and a wall with a splined toothing 13 with teeth extending parallel to an axis of rotation D of the universal joint shaft. In this, a sliding stubshaft 14, which has on the outside a splined toothing 15, is received in a longitudinally displaceable manner. The sliding stubshaft 14 is rigidly connected to the second joint yoke 4 of the universal joint 1. Thus, in the longitudinal displacement, which comprises the sliding stubshaft 14 and the plunging sleeve 12, length changes, which result from the change of the position of the universal joint shaft and thus the angulation at the two universal joints 1, 1' can be compensated. The longitudinal displacement is provided with a protective tube 16, which is fixed to the second joint yoke 4 of the universal joint 1 at one end and covers the outer surface of the plunging sleeve 12 and has at its other end a seal for sealing relative to this outer face. The two flanges 3 serve for connection to a driving or a driven part of a drive train, into which the universal joint shaft is incorporated.

Figure 2:
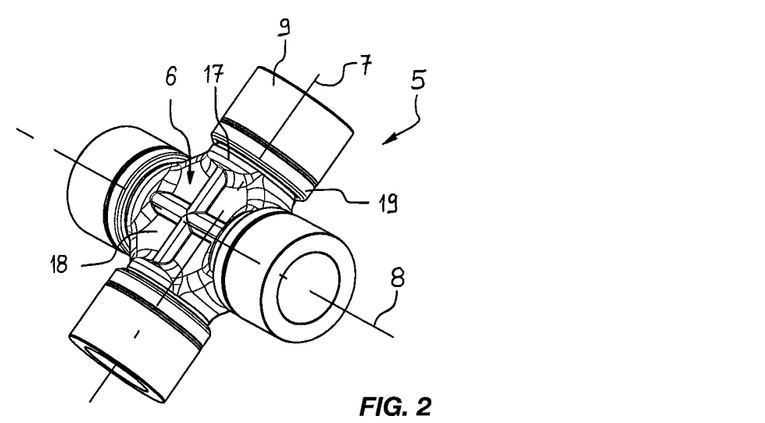

FIG. 2 shows a perspective representation of the journal cross assembly 5, as it is shown in FIG. 1. The journal cross assembly 5 comprises a journal cross 6 with a central base body 18, from which four journals 17 project, of which one is described exemplary with FIG. 2. Respectively two of the four journals 17 are arranged on a common longitudinal axis 7, 8 and are directed in opposite directions, wherein the two longitudinal axes 7, 8 intersect at a right angle each other.

Onto the journals 17 a sealing arrangement with a bearing bushing 9 and a protective ring 19 is pushed. The protective ring 19 serves for sealing the bearing chamber or the journal receptacle within the bearing bushing 9 and/or serves for the protection of a main seal arranged in the bearing bushing 9.

FIGS. 3 to 11 show the sealing arrangement and the protective ring 19 in different representations and are described in the following together.

Figure 3:
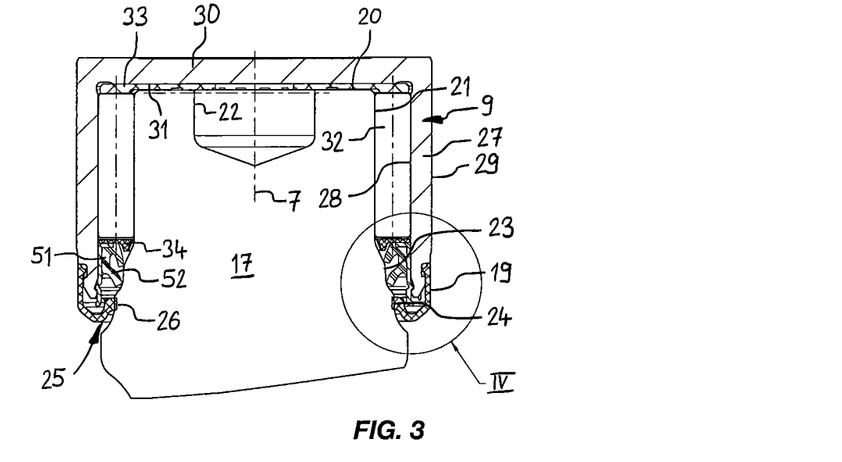

FIG. 3 shows a detail of the journal cross assembly 5 of FIG. 2 in a half-sectional view with an sectional plane, extending through the longitudinal axis 7. A part of the journal cross 6 with the journal 17 of FIG. 2 is shown. The journal 17 has an end face 20 and starting therefrom initially a cylindrical bearing surface 21 in direction towards the base body 18. Starting from the end face 20 a reservoir 22 for receiving lubricant is provided. Alternative to the reservoir 22, a lubricant channel can be provided, which is connected to lubricant channels of all journals 17 and to a lubricant nipple provided in the base body 18 for lubricating.

To the cylindrical bearing face 21, a sealing face 23 is connected, which merges in direction towards the base body 18 in a seat face 24. The sealing face 23 serves as a sealing face for a seal 51 and which rests in the bearing bushing 9. The seal 51 is inserted into an open end 25 of the bearing bushing 9 and is held non-rotationally to the bearing bushing 9 and has sealing lips 52, held in abutment to the sealing face 23, wherein a relative movement is carried out between the sealing face 23 of the journal 17 and the sealing lips 52, when the joint is articulated and a rotational movement is produced between the bearing bushing 9 and the journal 17.

The protective ring 19 is mounted and non-rotationally held on the seat face 24. For this, the protective ring 19 is oversized. This means, a central accommodation bore 26 of the protective ring 19 has an inner diameter, which is smaller than an outer diameter of the seat face 24. In FIGS. 3 to 6 the support ring 19 is shown not deformed, to illustrate the oversize.

The bearing bushing 9 has a hollow cylindrical envelope 27, which has a cylindrical inner face 28 and a cylindrical outer face 29. The cylindrical outer face 29 serves for receiving the bearing bushing 9 in the yoke bore in the joint yoke. Furthermore, the bearing bushing 9 has a bottom 30 with a bottom inner face 31 facing to the open end 25 of the bearing bushing 9 and which covers the end face 20 of the journal 17. Between the inner face 28 of the bearing bushing 9 and the bearing face 21 of the journal 17 an annular gap is formed, in which a ring of rolling members 32 in form of needles or rollers is arranged. The rolling bearings 32 roll thus on the bearing face 21 of the journal 17 and on the inner face 28 of the envelope 27 and enable a rotational movement of the bearing bushing 9 relative to the journal 17 around the longitudinal axis 7.

Towards the bottom 30 of the bearing bushing 9 the rolling members 32 are supported axially on a thrust washer 33, which is arranged between the bottom inner face 31 and the end face 20 and projects radially relative to the longitudinal axis 7 into the annular gap, in which the rolling members 32 are arranged.

Figure 4:
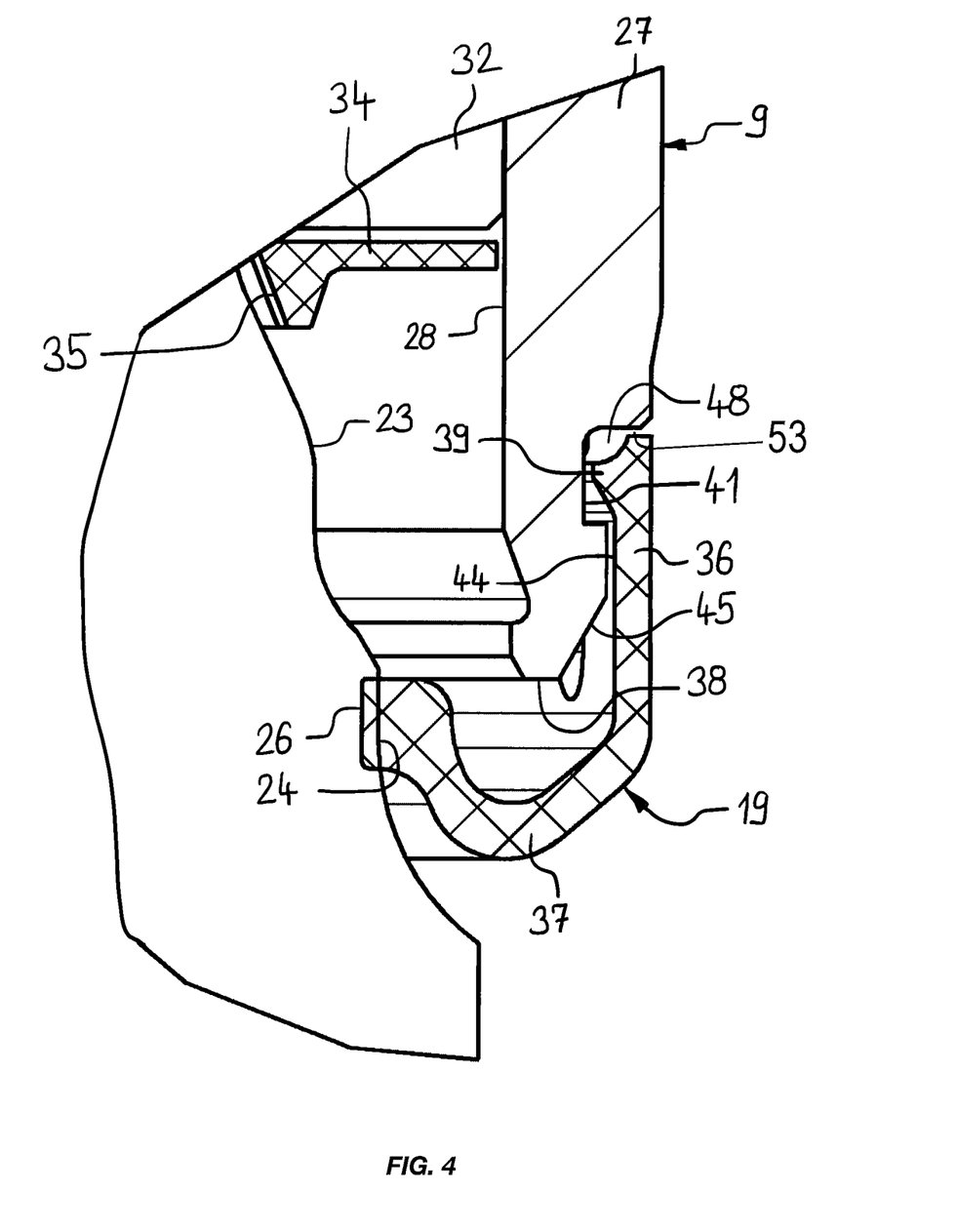
Figure 5:
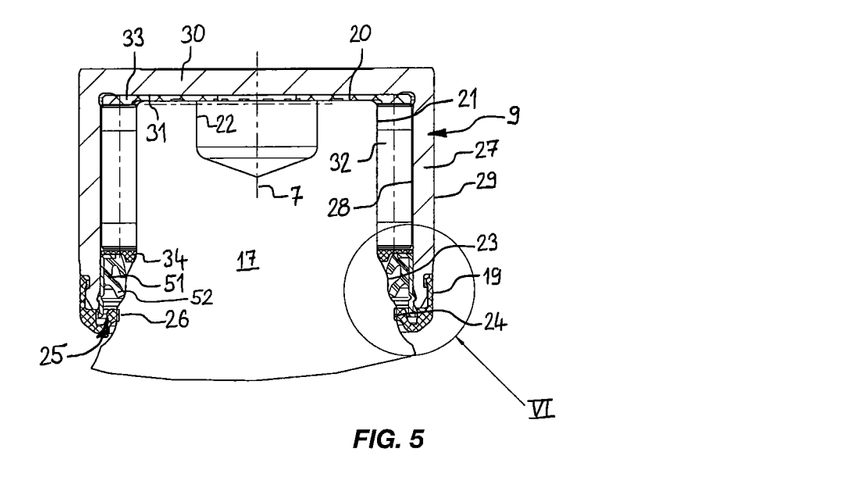
Figure 6:
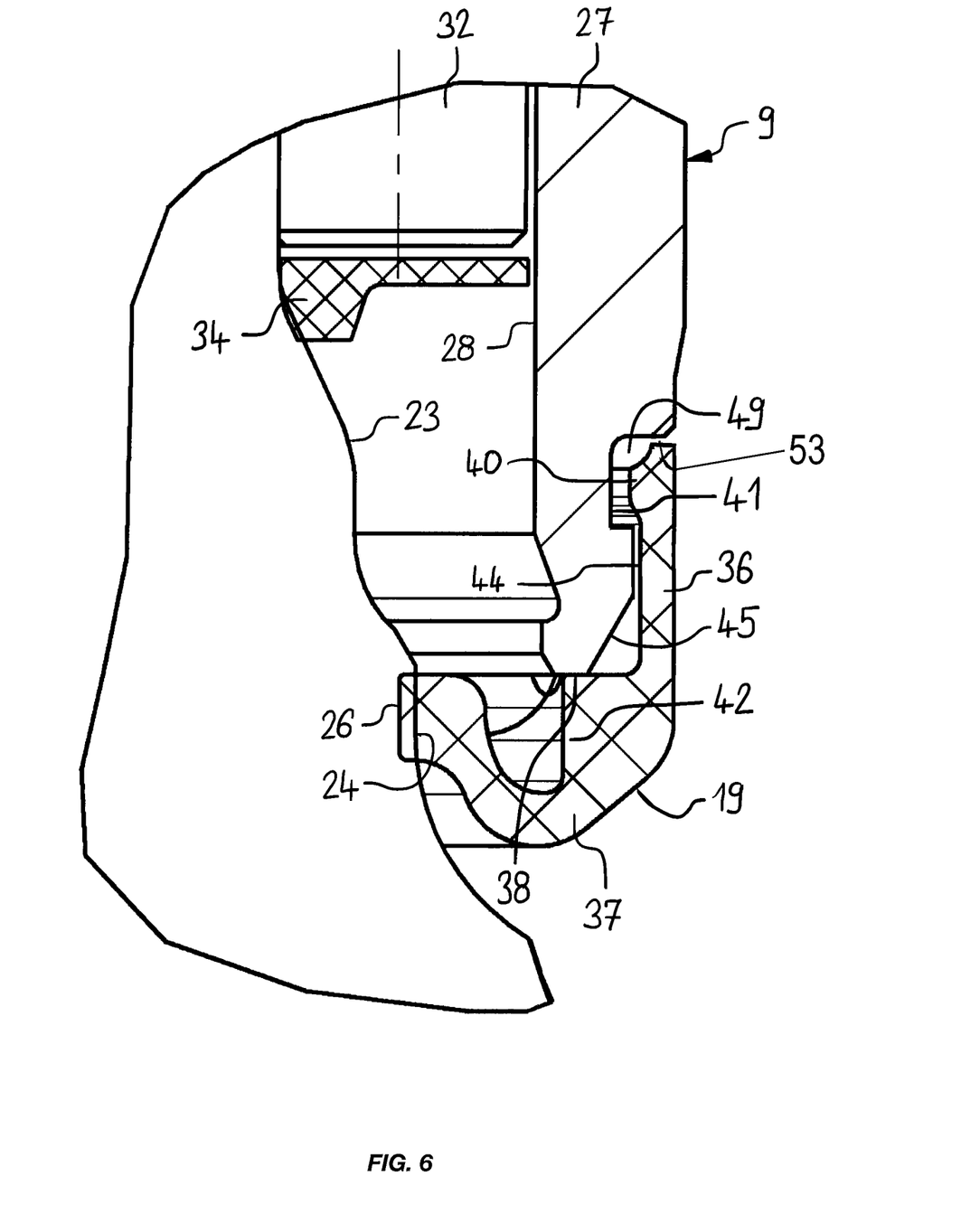
Figure 7:
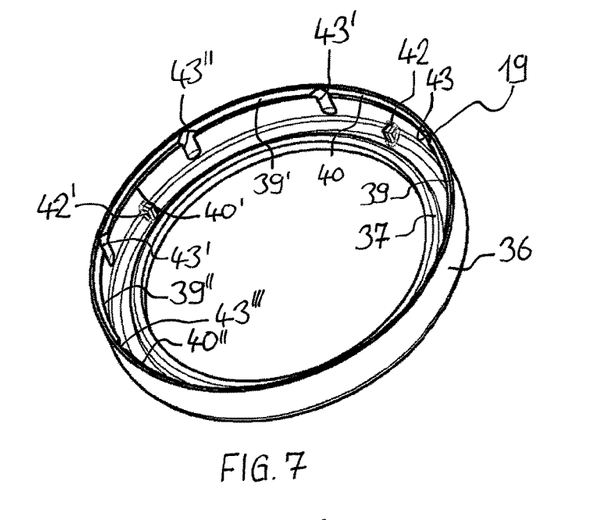

A movement of the rolling members 32 parallel to the longitudinal axis 7 away from the end face 20 in direction to the base body 18 is limited by a stop disc 34, which is pushed onto the journal 17 and is supported on a shoulder in the transition from the bearing face 21 to the sealing face 23 axially in direction to the base body 18. The stop disc 34 has internal axially extending grooves 35 (FIG. 4). These serve for transporting lubricant from the area of the annular gap, in which the rolling members 32 are arranged, in direction to the protective ring 19. Between the stop disc 34 and the protective ring 19 a main seal 51 is arranged, which, as already explained, is inserted into the open end 25 and is held non-rotationally there.

The protective ring 19 has a sleeve segment 36, which is formed essentially cylindrically and coaxially to the longitudinal axis 7. The sleeve segment 36 encloses the outer face 29 of the envelope 27 of the bearing bushing 9 in the area of the open end 25. At a rear axial end, facing away from the bottom 30 of the bearing bushing 9 and facing the base body 18 of the journal cross 6, the protective ring 19 has an annular seat segment 37, formed approximately flange-like and which projects from the sleeve segment 36 radially inwards relative to the longitudinal axis 7. The seat segment 37 forms the accommodation bore 36, with which the protective ring 19 is arranged on the seat face 24 of the journal 17. The seat segment 37 covers an end face 38, directed to the base body 18, of the envelope 27 of the bearing bushing 9 and the annular gap between the envelope 27 of the bearing bushing 9 and the journal 17. Thus, a main seal 51, arranged between the protective ring 19 and the stop disc 34 is protected from external influences. Furthermore, the protective ring 19 has itself already a sealing effect and acts a preseal.

The sleeve segment 36 has at a front axial end, facing away from the seat segment 37, protrusions 39, 40 facing radially inwards. The protrusions 39, 40 extend respectively along a portion of the circumference around the longitudinal axis 7 and are separated from each other by grooves 43, extending axially parallel to the longitudinal axis 7 and are arranged in an inner circumferential groove 44 of the sleeve segment 36.

Figure 8:
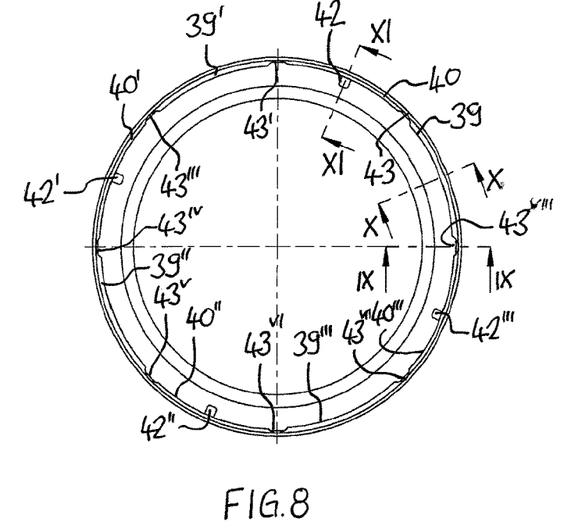
Figure 9:
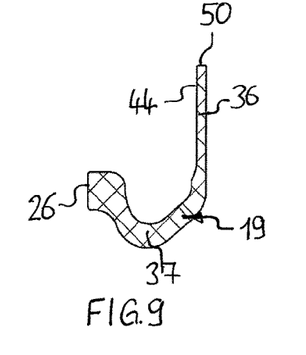
Figure 10:
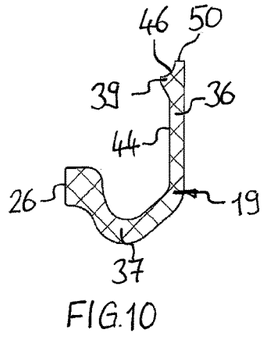
Figure 11:
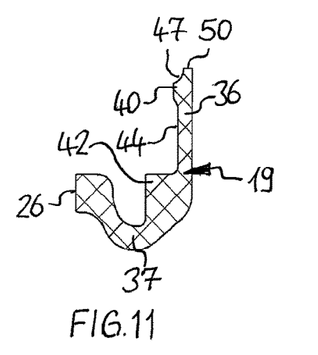

As especially visible in FIG. 8 and the cross-sectional representations of FIGS. 10 and 11, several first protrusions 39 and second protrusions 40 are arranged distributedly along the circumference, wherein the first protrusions 39 and the second protrusions 40 alternate. The first protrusions 39 project further from the inner circumferential face 44 radially inwards than the second protrusions 40. All protrusions 39, 40 serve for securing the protection ring 19 on the bearing bushing 9, insofar, as the protrusions 39, 40 engage in an outer circumferential groove 41 of the bearing bushing 9. During the assembly, the protection ring 19 is pushed in direction of the longitudinal axis 7 onto the open end 25 of the bearing bushing 9, wherein the protrusions 39, 40 abut a stop face 45 at the open end 25 of the bearing bushing 9. The stop face 45 is formed like a truncated cone, so that when pushing on the protection ring 19 the sleeve segment 36 is radially deformed outwards and expanded, till the protrusions 39, 40 snap into the outer circumferential face 41. Because of the lower second protrusions 40 or as these project to smaller extent radially inwards from the inner circumferential face 44, the deformation of the sleeve segment 36 is reduced during the mounting of the protection ring 19, without compromising the holding function.

The protrusions 39, 40 arranged distributedly along the circumference can project with different extent radially inwards. Thus, all protrusions 39, 40 can engage in the outer circumferential groove of the bearing bushing 9 and can lock the protective ring 19 therein. Further, some of the protrusions 39, 40 can project with a smaller extension radially inwards, to facilitate the assembly of the protective ring 19 on the bearing bushing 9. During the pushing-on of the protective ring 19 onto the bearing bushing 9, namely the sleeve segment 36 is deformed radially outwards until the protrusions 39, 40 snap into the outer circumferential groove 41 of the bearing bushing 9. If some of the protrusions 39, 40 have a smaller radial extension inwards, the sleeve segment 36 does not have to be deformed so far as in an embodiment with protrusions 39, 40, which project all identically radially inwards.

In the area of the front axial end of the sleeve segment 36, this has an end face 50, which is facing away from the seat segment 37. In the transition from the end face 50 to the protrusions 39, 40, concave recesses 46, 47 are formed. These form in the outer circumferential groove 41 respectively a gap 48, 49, by means of which it is prevented, that during the later varnishing of the journal cross assembly 5 capillary forces are produced, which pull varnish into the intermediate gap between the outer face 29 of the bearing bushing 9 and the inner circumferential face 44 of the sleeve segment 36. Generally, a radial gap 53 is provided between the bearing bushing 9 and the sleeve segment 36 of the protective ring 19, to enable a relative movement between the protective ring 19 connected rigidly to the journal 17 and the bearing bushing 9 held rotationally relative to the journal 17.

The concave recess 46, 47 ensures a sufficient gap 48, 49 between the outer circumferential face of the bearing bushing and the inner circumferential face 44 of the protective ring 19. Thus, it is prevented, that during the varnishing process after the assembly of the protective ring 19 on the bearing bushing 9 capillary forces are produced, which pull the applied varnish into the radial gap 48, 49 between the sleeve segment 36 and the bearing bushing 9. This would lead to the fact, that, when the varnish is hardened, the protective ring 19 is connected rigidly to the bearing bushing 9. The support ring 19 should however rest non-rotationally on the journal 17 and a relative movement should be enabled between the protective ring 19 and the bearing bushing 9.

Furthermore, the protective ring 19 has webs 42 arranged distributedly along the circumference and projecting from the seat segment 37 axially in direction to the longitudinal axis 7 and, at the same time, being integrally connected to the sleeve segment 36 projecting radially therefrom. The webs 42 are, thus, arranged in the transition between the sleeve segment 36 and the seat segment 37. In this case, the sleeve segment 36, the seat segment 37 as well as the webs 42 are formed integrally, i.e. as one piece. The protection ring 19 is supported via the webs 42 radially on the end face 38 of the bearing bushing 9. During the assembly of the bearing bushing 9, initially the thrust washer 33, the rolling members 32, the stop disc 34, a main seal 51, as well as the protection ring 19 are mounted in the bearing bushing. This unit is then pushed onto the journal 17 axially in direction of the longitudinal axis 7 towards the base body 18 onto the journal 17. As soon as the protection ring 19 has reached the seat face 24 of the journal 17, an increased axial force is produced for pushing-on the protection ring 17 with the accommodation bore 26 onto the portion of the journal 17 having a larger diameter, in the area of the seat face 24. In this case, the protection ring 19 is supported axially via the webs 42 on the bearing bushing 9.

As the webs 42 are arranged distributedly along the circumference, lubricant can exit from the annular gap between the envelope 27 of the bearing bushing 9 and the bearing face 21 of the journal 17 between the webs 42 and through the radial gap 53 between the sleeve segment 36 and the envelope 27 in circumferential direction during the lubrication of the bearing.

REFERENCE NUMERALS LIST 1, 1' universal joint shaft
2 first joint yoke
3 flange
4 second joint yoke
5 journal cross assembly
6 journal cross
7 longitudinal axis
8 longitudinal axis
9 bearing bushing
10 yoke bore
11 tube
12 plunging sleeve
13 spline toothing
14 sliding stubshaft
15 spline toothing
16 protective tube
17 journal
18 base body
19 protective ring
20 end face
21 bearing surface
22 reservoir
23 sealing face
24 seat face
25 open end
26 accommodation bore
27 envelope
28 inner face
29 outer face
30 bottom
31 bottom inner face
32 rolling members
33 thrust washer
34 stop disc
35 groove
36 sleeve segment
37 seat segment
38 end face
39 first protrusion
40 second protrusion
41 outer circumferential groove
42 web
43 groove
44 inner circumferential face
45 stop face
46 recess
47 recess
48 gap
49 gap
50 end face
51 seal or main seal
52 sealing lips
53 radial gap
D axis of rotation

The invention claimed is:

1. A sealing arrangement, comprising:
a bearing bushing for a journal cross assembly of a universal joint,
wherein the bearing bushing has a journal receptacle for receiving a journal of a journal cross;
a seal, wherein at least a portion of the seal is disposed within the bearing bushing;
a protective ring, which rests on an open end of the bearing bushing and has the following:
an annular sleeve segment, formed concentrically to a longitudinal axis;
an annular seat segment, extending at a rear axial end of the sleeve segment radially inwards;
at least one protrusion, projecting at a front axial end portion of the sleeve segment radially inwards;
a plurality of webs, arranged distributedly along the circumference projecting axially from the seat segment and arranged within the sleeve segment, wherein the bearing bushing is axially supported on the webs;
a circumferential end face facing axially away from the seat segment, which end face is arranged on the front axial end portion of the sleeve segment;
wherein adjacent to the end face of the protective ring in the transition between the end face and the at least one protrusion of the protective ring a concave recess is arranged ensuring a gap between the outer circumferential face of the bearing bushing and the inner circumferential face of the protective ring, avoiding capillary forces during a varnishing step of the journal cross assembly after the assembly of the protective ring on the bearing bushing;

wherein the at least one protrusion of the protective ring rests in an outer circumferential groove in the outer circumferential face of the bearing bushing locking the protective ring therein; and a radial gap is formed between the bearing bushing and the sleeve segment of the protective ring.

2. The sealing arrangement according to claim 1, wherein the webs are respectively arranged in a transitional area between the sleeve segment and the seat segment.

3. The sealing arrangement according to claim 1, wherein a plurality of protrusions is arranged distributedly along the circumference.

4. The sealing arrangement according to claim 3, wherein in an inner circumferential face of the sleeve segment axially extending grooves are arranged, which separate the protrusions from each other.

5. The sealing arrangement according to claim 3, wherein the protrusions project differently far radially inwards along the circumference.

* * * * *